Figure 1:
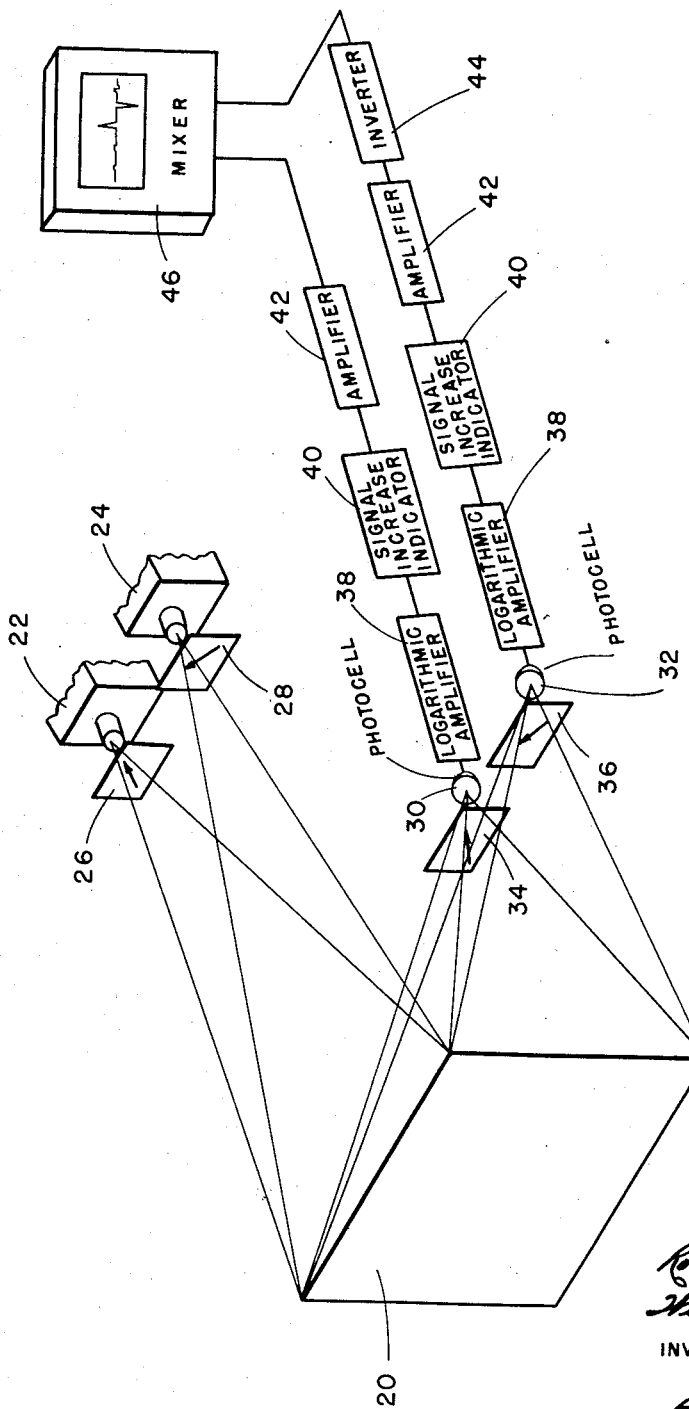

Oct. 7, 1958  R. C. JONES ET AL  2,854,883
SYNCHRONIZATION TESTER FOR RELATED MOTION PICTURE FRAMES
Filed May 27, 1953  3 Sheets-Sheet 3

Robert C. Jones
and
William A. Shurcliff
INVENTORS

BY: Brown and Mikulka
ATTORNEYS

United States Patent Office 2,854,883
Patented Oct. 7, 1958

2,854,883
SYNCHRONIZATION TESTER FOR RELATED MOTION PICTURE FRAMES

Robert C. Jones and William A. Shurcliff, Cambridge, Mass., assignors to Polaroid Corporation, Cambridge, Mass., a corporation of Delaware Application May 27, 1953, Serial No. 357,678

2 Claims. (Cl. 88—14)

This invention relates to synchronization testers and more particularly to methods and apparatus for measuring the synchronization error between two moving conjugate records such as a pair of stereoscopically related motion picture films.

Stereoscopic motion pictures depend for their effect of realism upon the simultaneous conveyance to the viewer of two distinct although closely related pictures. One of these pictures represents the scene as it would be viewed by an observer's left eye, and the other picture represents the scene as it would be viewed by an observer's right eye, and optical means are provided for rendering only the left-eye picture visible to the left eye of the observer and only the right-eye picture visible to the right eye as both pictures are simultaneously projected on the motion picture screen. The only practical system so far devised for this purpose is one in which the stereoscopic pairs of pictures are projected on the screen in differently polarized light and in which the spectator is provided with polarizing spectacles which optically separate the two images so that one only becomes visible to each eye. Of the several such systems which have been proposed for the projection of stereoscopic motion pictures, the one which has proven most adaptable to existing projection facilities involves two separate films, one of which carries the left-eye and the other the right-eye scenes. These are thrown on the screen simultaneously by two projectors. It will be readily appreciated that any error in synchronization between the stereoscopically related images of the films will adversely affect the stereoscopy and will be a source of discomfort and annoyance to the viewer. It becomes important, therefore, to find and to promptly correct such errors. These errors may originate from any of several sources. Errors may be introduced during the loading of the projectors or in the splicing of the films. They may also arise from the failure of the projectors to stay in synchronism although started in synchronism. The last-named error is especially difficult to detect and yet is one which occurs in electrically synchronized projectors by virtue of the slipping of the selsyn motors and in mechanical systems by the play in the connecting links between the projectors.

It is, accordingly, an object of the present invention to provide a novel process and novel apparatus for the ready determination of the extent of any error in synchronization of a pair of moving conjugate records such as a pair of stereoscopic films.

Another object of the present invention is to provide a process and an apparatus of the foregoing type which respond to changes in the scene brightness of motion picture films and indicate this change as a measure of the condition of synchronization of the respective frames of moving films and which can operate during the projection, rewinding or inspection of the films.

Another object of the present invention is to provide a novel process and apparatus of the foregoing type wherein there is employed photoelectric means for measuring the scene brightness and electronic means for converting this measurement into an indication of brightness change, the latter being made visible for both moving films concurrently on a single screen in a manner which makes possible an immediate determination of any synchronization error.

Other objects of the invention will in part be obvious and will in part appear hereinafter.

The invention accordingly comprises the process involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

Figure 7:
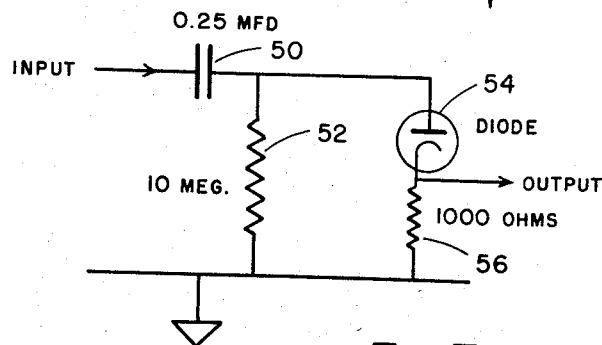
Figure 8:
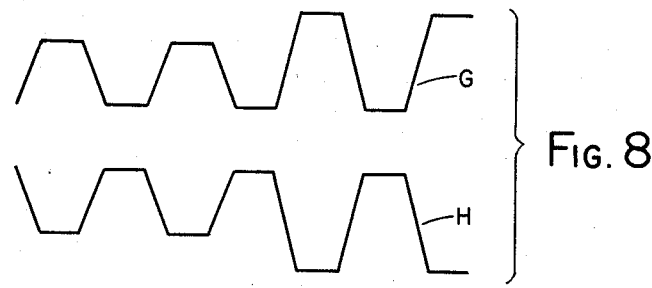
Figure 13:
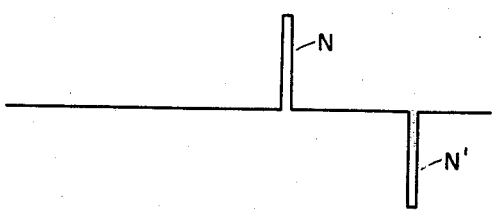
Figure 12:
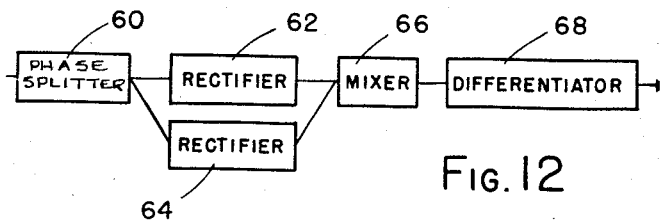

For a fuller understanding of the nature and objects of the invention, reference should be had to the following detailed description taken in connection with the accompanying drawings wherein:

Figure 1 is a schematic view of a novel system embodying the synchronization tester of the present invention, the circuit of said tester being shown as a block diagram;

Figs. 2, 3, 4, 5 and 6 graphically illustrate signals of the type which may be provided during operation in various portions of the circuit of Fig. 1;

Fig. 7 is a circuit diagram of a preferred form of the signal increase indicators of the circuit of Fig. 1;

Figs. 8, 9, 10 and 11 graphically illustrate signals of the type which may be provided in various portions of the circuit of Fig. 12;

Fig. 12 is a block diagram of the signal increase indicator which produces the signals illustrated in Figs. 8 through 11; and Fig. 13 is a graph showing the composite signal obtained when the signal increase indicator is used in a system similar to that shown in Fig. 1.

According to the present invention, there is provided a synchronization testing apparatus and process which is especially useful for determining the error in synchronization between stereoscopically related pairs of motion picture films wherein one of said films bears the left-eye and the other the right-eye scenes. As noted above, each of the pictures of stereoscopic pairs differs from the other in that it represents a different view of the scene, but the differences are really only in fine detail and perspective, and the brightness or the luminance of each of the scenes of a stereoscopic pair of pictures is essentially identical, whether measured over the entire area of the scene or only over a predetermined portion of the area.

In the present invention, the determination of the synchronism or lack of synchronism between two moving motion picture films depends upon this correspondence in luminance between the stereoscopic pairs and also upon the fact that, in a motion picture, changes in the brightness occur with great frequency as, for example, when the scene changes or when fast action occurs. In the preferred form of the invention, these changes are measured and an indication is obtained, for example on an oscilloscope screen or on the dial of a suitable indicator, of the interval, if any, between the occurrence of the same change in each of the films. If the changes occur in synchronism, the films are in synchronism; whereas, to the extent that the changes are out of phase, the films are out of synchronism, and the phase difference is a measure of the synchronization error.

In the following description, several electronic systems are disclosed for measuring and indicating synchronization errors during the movement of stereoscopic films during projection, and the said systems are described as responding to the scene brightness as it appears upon the motion picture screen. It is to be understood, however, that these same systems may be used in conjunction with any other optical arrangement which sufficiently illuminates the scenes on the separate films so that their brightness change can be measured.

In a preferred form of the invention, the measuring circuits hereinafter described are so constituted as to operate independently of the average scene brightness and of the difference in over-all brightness between the two films and depend primarily on the fractional increase of the scene brightness of each film. This feature also renders the operation of these circuit systems independent of their position in relation to the screen in the theater so that the utmost flexibility is possible in positioning the devices embodying the said systems for the performance of their intended function.

Referring now to Figs. 1 through 7, there is shown diagrammatically a stereoscopic motion picture projection arrangement embodying one example of the novel synchronization tester of the present invention.

As shown, 20 represents a theater screen upon which two stereoscopic images are simultaneously projected and superposed by means of a pair of projectors 22 and 24 through which are fed the stereoscopic films whose synchronism is to be determined. A pair of polarizing filters 26 and 28, for example plane polarizers whose polarizing axes are at 90° to one another, are interposed between the films and the screen so that each of the two projected images is differently polarized. These images, when viewed through a pair of spectacles whose lenses are also polarizers and which have their polarization axes corresponding to the polarization axes of the polarizing filters 26 and 28, give the observer a realistic three-dimensional picture.

In order to determine the synchronization of the moving films, there is provided, somewhere in the theater in a position to have the light from the films incident thereon, either directly or by reflection from the screen, a pair of photocells 30 and 32. Between said photocells and screen 20 there are provided filters 34 and 36, and, as shown, filter 34 is so located as to intercept the light incident upon cell 30 from said screen and filter 36 is positioned to intercept the light incident upon cell 32 from said screen. Filters 34 and 36 are preferably light-polarizing and have their polarizing axes so arranged in relation to one another and to the polarizing axes of the pictures on the screen as to cause cell 30 to receive the light from the one and cell 32 to receive the light from the other of the two images projected on screen 20. Thus, for example, cell 30 will respond to the brightness of the left-eye pictures whereas cell 32 will respond to the brightness of the right-eye pictures, and the photocell output will be a measure of the intensity of the light emanating from each scene. Each of the photocells feeds its output to an electronic channel consisting of a logarithmic amplifier 38, a signal increase indicator 40 and an amplifier 42, and one of the two resulting signals is reversed by an inverter 44, the signals being thereafter mixed in a mixer 46 which, in the form shown, comprises an oscilloscope on which the mixed signal may be viewed.

Figure 2:
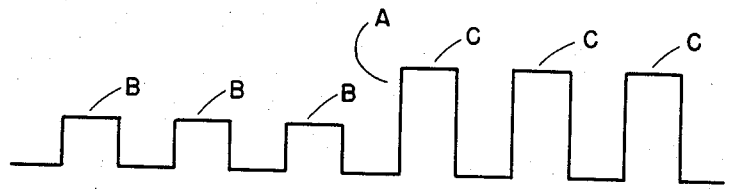

Considering now the electronic circuit which is present in each of the two channels, namely the circuit consisting of logarithmic amplifier 38, the signal increase indicator 40 and the amplifier 42, the operation of these components in the process may be better understood from Figs. 2 through 5 which illustrate graphically the functions performed by these components. In Fig. 2, there is represented, in effect, the photocell current plotted against time, which might also be considered as a plot of the light intensity of the scene or the portion of the scene which is incident upon the photocell. The graph as shown is a plot of the light intensity of roughly three film frames and indicates a scene change in the middle A of the graph at the right of which there is an increase in scene brightness. The three rectangular pulses B to the left of this representation correspond to a frame and one-half before the scene change and the three larger pulses C to the right of the center line correspond to a frame and one-half after the scene change. This is the waveform of the output of the photocell and constitutes the input of the logarithmic amplifier 38 which amplifies the input signals linearly if the amplitude is less than a predetermined value, e. g., about 5 millivolts peak to peak. For signals of this type, the amplifier output is directly proportional to the amplifier input. For input signals in the higher range, e. g., from 5 millivolts to more than 1 volt, the output of the logarithmic amplifier becomes directly proportional to the logarithm of the input.

The output of logarithmic amplifier 38 is then fed into a signal increase indicator 40, the circuit diagram of one form of said indicator being shown in Fig. 7. The special form of signal increase indicator shown in Fig. 7 is essentially a rectifier but differs in one substantial respect from a simple rectifier in that its output is taken not from the plate of the diode but from the cathode. Thus, as each of the pulses shown in Fig. 2 is fed through condenser 50, the latter charges up to the full amplitude of the pulse. However, during the one-ninety-sixth of a second between the cessation of one pulse and the beginning of another, the condenser discharges through resistor 52, whose resistance is relatively high so that the time constant of the condenser-resistor combination is of the order of one or more seconds. Thus, the condenser voltage is reduced only a single percentage or less during the one-ninety-sixth of a second between the pulses. As a result, at the initiation of the next pulse, the condenser voltage must be increased by this small fraction of its original condenser voltage, and this is done by conduction through a diode 54 and a resistor 56, the latter resistor having only a fraction of the resistance of resistor 52. This change in current which occurs at the initiation of each of the pulses of the same intensity as the preceding pulse is shown by the small pips E in the graph of Fig. 3.

Figure 3:
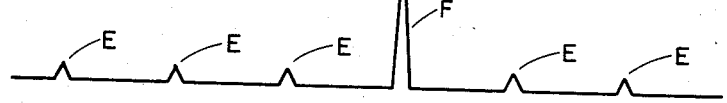

When there is a screen brightness increase, for example, of approximately 50% as shown in Fig. 2 by the pulses C, there must be, at the onset of this increase, a change in current corresponding to the percentage increase, to wit, approximately 50%, instead of the fractional increase which produces the small pips E in Fig. 3. Accordingly, the pulse of the current through resistor 56 will be many times greater at the initiation of the scene change than it will be during the scenes where there is no change of brightness, and this gives, as its distinctive signal, the tall pip F of Fig. 3.

In one preferred structure of the present invention, condenser 50 has a capacitance of 0.25 mfd. Resistor 52 has a resistance of 10 megohms and resistor 56 a resistance of 1000 ohms. With this circuit, since the time constant of the condenser-resistor combination 50, 52 is 2.5 seconds, the condenser voltage is reduced only 0.4% during the one-ninety-sixth of a second between the pulses. At the initiation of the next pulse, the condenser voltage is increased by this 0.4% by conduction through the diode and the 1000 ohm resistor. When there is a screen brightness increase of 50%, there is, at the onset of this pulse of increased amplitude, a change in current corresponding to a 50% increase instead of a 0.4% increase. Accordingly, the surge of current through resistor 56 at the beginning of a 50% increase in screen brightness will be one hundred twenty-five times the current at the beginning of a pulse when there is no change of brightness. Thus, although modulations from zero to a constant intensity occur at the rate of forty-eight times a second during a period when the screen brightness is constant because of the normal interruption of the projection of the film to permit it to be viewed without flicker, these variations produce no more fluctuation in the output of the signal increase indicator 40 than is represented in the graph by the small pips of Fig. 3. However, an increase of approximately 50% in scene brightness above the existing constant brightness immediately produces a one hundred twenty-five times greater output, as is represented by the tall pips of Fig. 3.

In this system, the gain control in the logarithmic amplifier 38 is adjusted so that the weakest useful signals correspond to the transition from linear to logarithmic amplification. The purpose of this logarithmic amplification is to assure that the pulse height at the output of the signal increase indicator 40 depends only on the fractional increase of this signal and is independent of the absolute amplitude of the signal. The over-all system is thus independent of the average screen brightness and also of the position of the photocell unit in the theater.

Figure 4:
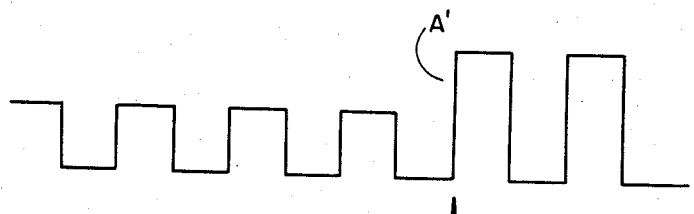
Figure 5:
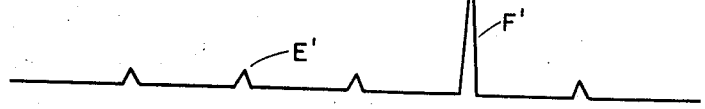
Figure 6:
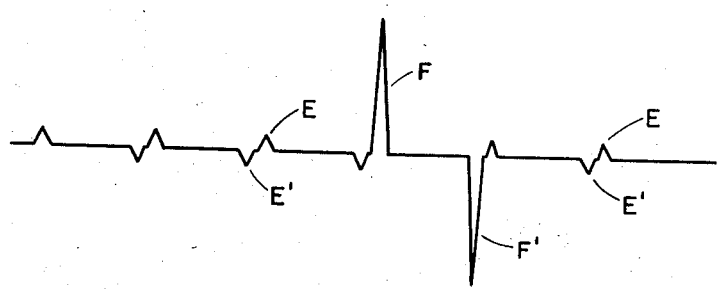

To better understand the functioning of the above circuits it may be well to consider, by way of example, the situation when the left-eye and right-eye images are out of synchronism. The signal shown in Fig. 4 is representative of that given by a film which is lagging approximately three-eighths of a frame behind the other film. The output of the photocell under such circumstances is plotted in Fig. 4, and it is to be noted that the change in scene A' represented by the increase in screen brightness is displaced to the right of the change A by a time representing approximately three-eighths of a frame. The corresponding output of the signal increase indicator 40 of this channel is shown in Fig. 5, and it is to be noted that the small pips E' and tall pips F', which represent the change in luminance due to the scene change, have been shifted by approximately three-eighths of a frame on the curve.

At this stage, inverter 44 in one of the electronic channels connected to the photocells functions to invert the signal derived from the signal increase indicator. In the present embodiment, the signal of Fig. 5 is inverted, and thereafter the signal of Fig. 3 and the inverted signal of Fig. 5 are fed into and combined in a mixer 46 and the output of this mixer has the waveform shown in Fig. 6.

This waveform can be viewed on an oscilloscope which is shown as a part of the structure of mixer 46 and preferably is an oscilloscope with a long persistent screen as, for example, one that has been adjusted so that it retraces at the rate of six times per second. In such a structure, a single trace corresponds to four complete frames. Thus, an observer of the trace produced by the oscilloscope is able to readily determine when the two films are out of phase by merely noting when the tall pips represented on the waveform are not in full synchronism. Moreover, the displacement of these waveform peaks is an exact measure of the synchronization error. It thus becomes possible to readily make whatever adjustment is necessary in the mechanical or electrical system which interconnects the two projectors to correct the synchronization error and to observe the immediate effects of this correction upon the oscilloscope.

It is to be understood that many modifications of the aforementioned electronic arrangement are within the purview of the present invention. For example, it is possible to display the two signals obtained from amplifier 42 so that the traces shown in Figs. 3 and 5 are represented without any inversion upon the oscilloscope screen. For this purpose it would only be necessary to have a two-gun oscilloscope. It will also be appreciated from the foregoing that logarithmic amplifier 38 and amplifier 42 are not essential to the successful operation of the above-described system although for most practical purposes the presence of at least the logarithmic amplifier is very desirable.

Figure 9:
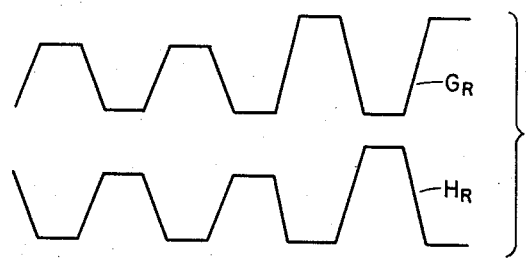
Figure 10:
Figure 11:
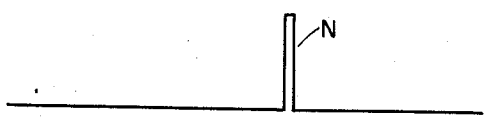

A modification of the system contemplates use of the elements of Fig. 12 in place of each signal increase indicator 40 of Fig. 1, to provide signals of the type illustrated in Figs. 8 through 13. In this arrangement of elements, the signal or output from a given logarithmic amplifier 38 is the input of a phase splitter 60 (Fig. 12) and gives the two signals G and H represented by the graphs of Fig. 8, the lower signal being the inverted signal. Each of these two signals is rectified, i. e., clamped in such a way that the most negative value of each signal is zero by being fed into suitable rectifiers 62 and 64. The rectified signals $G_R$ and $H_R$ are shown in Fig. 9, the signal corresponding to the upper signal of Fig. 8 being shown as the upper signal of Fig. 9. The two rectified signals are then added by a mixer 66 to give the combined signal shown in Fig. 10, and it is to be observed that the sum is a constant voltage so long as the film luminance does not change. However, when there is a sudden increase in film luminance from one frame to the next, the voltage increases suddenly as at M.

The signal which is the output of mixer 66 is then fed into a differentiator 68 and differentiated to give a positive pulse when and only when there is a sudden increase in luminance from one frame to the next. The output of differentiator 68 is connected to an oscilloscope with a long persistent screen, as described with respect to Fig. 6. This pulse is the tall pulse N of Fig. 11. It has been explained, above, that the components of Fig. 12 are used twice in the system of Fig. 1, namely, in place of each of the elements 40, and that there is obtained on the oscilloscope, in the event of a synchronization error similar to the error illustrated in Figs. 3 through 6, a waveform, comprising two similar signals of opposite sign N and N' as shown in Fig. 13, from which the synchronization error and its magnitude can be readily determined by even an untrained observer.

It is to be observed particularly that in both of the aforementioned systems there is obtained a reading of the total error rather than a reading of just the whole frame errors or fractional errors.

In order to avoid the necessity of requiring an observer to keep his eyes fixed on the oscilloscope at all times, it is possible to substitute for the inverter and mixer of the system of Fig. 1 an electronic element capable of giving a direct reading on a meter of the sign and the amplitude of the difference in time of the two pulses that are received by amplifier 42. It is also possible to feed such a reading into a suitable device for actuating a differential in the interlock between film projectors to automatically adjust for errors in synchronization.

Although the above-described systems for determining synchronization have been disclosed in an arrangement suitable for measuring and indicating the synchronization error of a pair of moving stereoscopic films, it will now be apparent that the underlying concepts are useful for testing the synchronization of any pair of conjugate records which include matched sequences varying in intensity from sequence to sequence. For the photocells of the above embodiments there may be substituted other intensity-measuring devices depending upon the nature of the moving records whose synchronization is being determined. It is to be noted that the signal increase indicator of the above systems, by providing a clear indication of changes in intensity level, is, in effect, a means for registering sequence transition and that, by measuring the interval between corresponding transitions in the two records as given by the said signal increase indicator, there is obtained a clear indication of the synchronism or lack of synchronism of the said records.

It is to be noted also that the above-described electronic systems, as applied to motion picture projection, while giving a distinctive pulse whenever there is a change in luminance of the film frames, whether caused by a scene change or fast action, effectively ignore the modulations in actual brightness of the screen which are introduced only by the projector shutter.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. Apparatus for determining synchronism and non-synchronism in the positioning of stereoscopically related frames of a separately projected pair of motion picture films at the respective gates of a pair of motion picture projectors, said apparatus comprising means for moving one of said films containing frame sequences of varying density past a source of illumination, means for moving a second of said films containing frame sequences of varying density which are stereoscopically related to those of said first-named film past a second source of illumination, means for polarizing the light transmitted by each of said pair of motion picture films in a direction different from that of the other, screen means for reflecting the differently polarized projected light so as to maintain the differential polarization thereof, polarizing means for differentially analyzing light from said screen means to permit selective transmission thereof, individual photoelectric cell means positioned in the path of pulsations of light provided by said light sources in conjunction with density differences of the frames of said films and shutter means of said projectors for converting said pulsations, as selectively received from said screen and analyzing means, to electric pulses which vary in amplitude with variations in the intensity of said pulsations of light, electronic amplifying means receiving the output of each of said photoelectric cell means for logarithmically amplifying the pulses of said output, individual electronic rectifying means receiving the outputs of said amplifying means for sharpening said pulses and for providing in combination with said amplifying means distinguishing sharpened pulses upon the arrival of the first frames of said frame sequences at the gates of said projectors, said distinguishing pulses varying in amplitude with respect to pulses identified with succeeding frames of the sequences with which they are associated, electronic means for maintaining said succeeding pulses produced by said density differences and shutter means at substantially constant amplitude levels differing from those of said distinguishing pulses, and electronic indicating means receiving the individual output of each of said rectifying means and providing a visual indication of the synchronous or nonsynchronous condition of stereoscopic pairs of said distinguishing pulses.

2. Apparatus for determining synchronism and non-synchronism in the positioning of stereoscopically related frames of a separately projected pair of motion picture films at the respective gates of a pair of motion picture projectors, said apparatus comprising means for moving one of said films containing frame sequences of varying density past a source of illumination, means for moving a second of said films containing frame sequences of varying density which are stereoscopically related to those of said first-named film past a second source of illumination, individual photoelectric cell means positioned in the path of pulsations of light provided by said light sources in conjunction with density differences of the frames of said films and shutter means of said projectors for converting said pulsations to electric pulses which vary in amplitude with variations in the intensity of said pulsations of light, electronic amplifying means receiving the output of each of said photoelectric cell means for logarithmically amplifying the pulses of said output, individual electronic rectifying means receiving the outputs of said amplifying means for sharpening said pulses and for providing in combination with said amplifying means distinguishing sharpened pulses upon the arrival of the first frames of said frame sequences at the gates of said projectors, said distinguishing pulses varying in amplitude with respect to pulses identified with succeeding frames of the sequences with which they are associated, electronic means for maintaining said succeeding pulses produced by said density differences and shutter means at substantially constant amplitude levels differing from those of said distinguishing pulses, and electronic indicating means receiving the individual output of each of said rectifying means and providing a visual indication of the synchronous or non-synchronous condition of stereoscopic pairs of said distinguishing pulses, each said electronic rectifying means comprising condenser means having voltage pulses from said logarithmic amplifier applied thereto, resistor means through which said condenser discharges twice for each shutter interruption of the projector providing small voltage reductions across said condenser, diode means caused to conduct through discharges of said condenser and, with a second resistor means, providing reinstatement of said voltage across said condenser immediately following said voltage reductions and an output of pulses of substantially consistent frequency and amplitude, said diode also conducting to provide an output of distinguishing pulses of differing amplitude with respect to said last-named pulses in response to fractional variation of input signals occurring during positioning of the first frames of frame sequences at the projector gates, said outputs being taken from the cathode of said diode.

References Cited in the file of this patent

UNITED STATES PATENTS

| | | |
|---|---|---|
| 1,958,612 | Dawson | May 15, 1934 |
| 2,413,349 | Hancock et al. | Dec. 31, 1946 |
| 2,517,246 | Seitz et al. | Aug. 1, 1950 |
| 2,528,977 | Simmon | Nov. 7, 1950 |
| 2,561,243 | Sweet | July 17, 1951 |
| 2,594,382 | Bedford | Apr. 29, 1952 |
| 2,626,989 | Brown | Jan. 27, 1953 |
| 2,648,723 | Goldsmith | Aug. 11, 1953 |
| 2,653,508 | Whiteley | Sept. 29, 1953 |